United States Patent Office 2,904,558
Patented Sept. 15, 1959

2,904,558

OXATRICYCLODECENES

Erhard J. Prill, Dayton, Ohio, assignor to Monsanto Chemical Company, St. Louis, Mo., a corporation of Delaware No Drawing. Application September 28, 1955
Serial No. 537,299

6 Claims. (Cl. 260—346.2)

This invention relates to 1,7,8,9,10,10-hexachloro-4-oxatricyclo[5.2.1.0$^{2,6}$]-8-decenes and to a method of preparing these oxatricyclodecenes.

The process which is the subject of this invention is based on the surprising discovery that, when hexachlorocyclopentadiene is reacted with an alkenediol, the Diels-Alder addition which takes place is accompanied by cyclodehydration to give an oxatricyclodecene, as shown by the following equation:

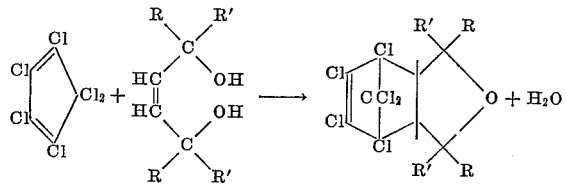

where R and R' taken separately are selected from the class consisting of hydrogen atoms and hydrocarbon radicals of from 1 to 18 carbon atoms, and R and R' taken together form, with the carbon atom to which they are linked, a six-membered carbocyclic ring system carrying no substituent other than hydrogen and chlorine atoms.

The presently useful alkenediols may be prepared by the reaction of an acetylenic compound with a carbonyl compound, i.e., an aldehyde or ketone, using conventional ethynylation procedures, followed by reduction of the acetylenic bond to an olefinic bond between the two contiguous carbon atoms adjacent to the two carbinol groups. Alkenediols which are employed in the present process are preferably those of the cis configuration. The alkenediols which may be employed in the present process include 2-butene-1,4-diol; symmetrical 1,4-loweralkyl derivatives of 2-butene-1,4-diol such as 3-hexene-2,5-diol, 2,5-dimethyl-3-hexene-2,5 diol, 4-octene-3,6-diol, 3,6-dimethyl-4-octene-3,6-diol, 5-decene-4,7-diol, etc.; symmetrical 1,4-higher-alkyl derivatives of 2-butene-1,4-diol such as 1,4-di-3-heptyl-2-butene-1,4-diol, 1,4-dinonyl-2-butene-1,4-diol, 1,4-didodecyl-2-butene-1,4-diol, etc. Another class of ethylenic glycols useful in the present process are asymmetrical alkenediols such as 2-pentene-1,4-diol, 2-hexene-1,4-diol, 2-heptene-1,4-diol, 3-octene-2,5-diol, 2-tridecene-1,4-diol, 2-methyl-3-tetra-decene-2,5-diol, etc. Also amenable to the present reaction are alkenediols of the above formula, wherein R and R' taken together form, with the carbon atom to which they are linked, a six-membered carbocyclic ring on which there are no substituents other than hydrogen or chlorine atoms; examples of such cyclic diol compounds are 1,1'-vinylenedicyclohexanol, 2,2',3,3',4,4,4',4',5,5',6,6' - dodecachloro-1,1',-vinylenedi(2,5-cyclohexadien-1-ol), etc.

In carrying out the present reaction, hexachlorocyclopentadiene is simply contacted with the alkenediol until reaction is complete. As shown by the above schematic equation of the reaction, a 1:1 adduct formation takes place, accompanied by dehydrative cyclization. The reactants are accordingly employed generally in approximately equimolecular amounts, though an excess of the more readily avialable component may be used if desired, so as to insure more complete utilization of the less readily available reactant. Preferably, means are provided to remove the water formed in the cyclization, as, for example, an air condenser. The temperature of the reaction naturally varies with the reactants and the reaction conditions; conveniently, at atmospheric pressure, a temperature of above 100° C. will be employed, so as to facilitate removal of the water of dehydration. Alternatively, the reaction may be conducted at decreased pressure, whereby the removal of the water of dehydration is accomplished by vaporization, while the reaction may be conducted at generally lower temperatures; care, however, should be taken to avoid the loss of hexachlorocyclopentadiene in this case. Conversely, with recalcitrant diols, higher temperatures may be applied, for example, so as to accelerate the reaction and attain completion of the reaction in shorter times, and in this case, if desired, application of superatmospheric pressure may be useful. The decomposition temperatures of the reaction mixture ingredient should not, naturally, be exceeded.

Either batch or continuous procedures may be used in carrying out the present process.

Catalysts have been found generally unnecessary in this reaction; if desired, however, the process may be accelerated by the addition of catalysts, such as condensation catalysts, which may promote the cyclodehydration process; suitable catalysts are, for example, acids such as hyrochloric acid, sulfuric acid, toluenesulfonic acid, etc. In some cases, addition of a trace of a polymerization inhibitor, such as hydroquinone, may be desirable to avoid loss of the ethylenic diol. Solvents and diluents may advantageously be employed in many cases; examples of useful solvents or diluents are hydrocarbons, which may be aromatic, such as benzene or toluene, or aliphatic, such as hexane; liquid chlorine compounds, such as o-dichlorobenzene or ethylene dichloride; certain oxygen-containing solvents, such as ethers, e.g., tetrahydrofuran, etc.

The products of the reaction are oxatricyclodecenes of the structure

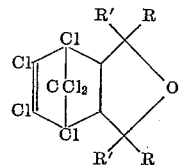

The possibilities of optical and steric isomerism in compounds of the above structure will be obvious to those skilled in the art. In the discussion below, the products of the present reaction are named with reference only to the position of substituents, and it is intended to include by these designations any or all of the possible optical or steric structural isomers comprehended thereby.

From hexachlorocyclopentadiene and cis-2-butene-1,4-diol is obtained 1,7,8,9,10,10-hexachloro-4-oxatricyclo [5.2.1.0$^{2,6}$]-8-decene. Symmetrically substituted 1,4-lower-alkyl-2-butene-1,4-diols reacted with hexachlorocyclopentadiene by the present process give, for example, 1,7,8,9,10,10 - hexachloro - 3,5 - dimethyl-4-oxatricyclo [5.2.1.0$^{2,6}$]-8-decene, 1,7,8,9,10,10 - hexachloro - 3,5-diethyl - 4 - oxatricyclo[5.2.1.0$^{2,6}$]-8-decene, 1,7,8,9,10,10-hexachloro - 3,5-dipropyl-4-oxatricyclo[5.2.1.0$^{2,6}$]-8-decene, 1,7,8,9,10,10 - hexachloro - 3,5-dibutyl-4-oxatricyclo [5.2.1.0$^{2,6}$] - 8 - decene, 1,7,8,9,10,10-hexachloro-3,3,5,5-tetramethyl - 4 - oxatricyclo[5.2.1.0$^{2,6}$]-8-decene, 1,7,8, 9,10,10 - hexachloro - 3,5 - diethyl-3,5-dimethyl-4-oxatricyclo[5.2.1.0$^{2,6}$]-8-decene, etc.

Asymmetrical lower-alkyl-2-butene-1,4-diols may also be reacted with hexachlorocyclopentadiene by the present process, the products of the reaction being, for example, 1,7,8,9,10,10-hexachloro - 3 - methyl - 4 - oxatricyclo[5.2.1.0$^{2,6}$]-8-decene, 1,7,8,9,10,10-hexachloro-3-propyl-4-oxatricyclo[5.2.1.0$^{2,6}$] - 8 - decene, 1,7,8,9,10,10-hexachloro - 3,3 - dimethyl-4-oxatricyclo[5.2.1.0$^{2,6}$]-8-decene, 1,7,8,9,10,10 - hexachloro-3-isopropyl - 4 - oxatricyclo[5.2.1.0$^{2,6}$] - 8 - decene, 1,7,8,9,10,10-hexachloro-3-n-butyl-4-oxatricyclo[5.2.1.0$^{2,6}$]-8-decene, etc.

Exemplary 3- and/or 5-higher-alkyl derivatives of the present oxatricyclodecenes obtainable by the present process include, for example, 1,7,8,9,10,10-hexachloro-3,5-dinonyl-4-oxatricyclo[5.2.1.0$^{2,6}$]-8-decene, 1,7,8,9,10,10-hexachloro - 3,5 - di - 3-heptyl-4-oxatricyclo[5.2.1.0$^{2,6}$]-8-decene, 1,7,8,9,10,10-hexachloro - 3,5 - diheptadecyl-4 - oxatricyclo[5.2.1.0$^{2,6}$] - 8 - decene, 1,7,8,9,10,10-hexachloro - 3 - heptadecycl - 4 - oxatricyclo[5.2.1.0$^{2,6}$]-8-decene, 1,7,8,9,10,10 - hexachlore - 3,3 - diheptodecyl-4-oxatricyclo[5.2.1.0$^{2,6}$]-8-decene, etc.

Also available by the present process are spiro oxatricyclodecene derivatives, of the above formula where R and R' taken together form, with the carbon atom to which they are linked, a carbocyclic six-membered ring free of substituents other than hydrogen and chlorine atoms. Thus, for example, the reaction of 1,1'-vinylenedicyclohexanol with hexachlorocyclopentadiene gives 1',7',8',9',10',10' - hexachloro - 4' - oxadispiro[cyclohexane - 1,3' - tricyclo - [5.2.1.0$^{2',6'}$] - 8' - decene - 5',1''-cyclohexane] of the structure:

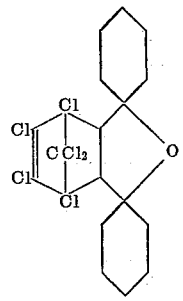

Similarly, by the reaction of hexachlorocyclopentadiene with 2,2',3,3',4,4,4',4',5,5',6,6'-dodecachloro - 1,1' - vinylene-di(2,5-cyclohexadien-1-ol), there is prepared 1,1',1'', 2,2'',4,4'',5,5'',6,6,6'',6''',7',8',9',10',10' - octadecachloro-4'-oxadispiro[1,4-cyclohexadiene - 3,3' - tricyclo[5.2.1.0$^{2'}$,$^{6'}$]-8'-decene-5',3''-1''',4''-cyclohexadiene], etc.

The present products which may be prepared by the process of this invention are, generally, highly stable compounds which range from crystalline solids to oily liquids. They are active biological toxicants and are useful as components of agricultural pesticidal compositions. The The simplest member of the present series, where R and R' of the above general formula represent hydrogen atoms, i.e., 1,7,8,9,10,10 - hexachloro - 4 - oxatricyclo[5.2.1.0$^{2,6}$]-8-decene, is useful as a nematode toxicant. The present hexachlorooxatricyclodecenes wherein short-chain alkyl groups are substituted on the carbon atoms contiguous with the oxygen atom of the ring skeleton may be usefully applied as agricultural insecticides. The oxatricyclodecenes of the above formula, wherein an R is a long-chain-alkyl radical, possess heightened oil solubility, and may be used as oil additives, e.g., for the inhibition of corrosion, and also as non-flammable plasticizers for polymers such as polyvinyl chloride. The spiro compounds susceptible of manufacture by the process of the invention as described hereinabove may be utilized as insecticides; the highly chlorinated dispiro compounuds of this series are also particularly stable to high temperatures and may be used as dielectrics. The new compounds of the invention are also useful as intermediates in organic syntheses, e.g., they may be converted to more highly chlorinated derivatives, etc.

The invention is further illustrated, but not limited, by the following examples:

Example 1

A mixture of 17.6 g. (0.2 mole) of cis-2-butene-1,4-diol and 54.6 g. (0.2 mole) of hexachlorocyclopentadiene in 50 g. of o-dichlorobenzene was refluxed for 7 hours, the water evolved during the reaction being removed through an air condenser at room temperature. On cooling, crystals separated from the reaction mixture. The colorless crystalline product, isolated by filtration and washing with cold methanol, weighed 13.7 g.; an additional 18.3 g. of the product were recovered from the filtrate. A sample of the original precipitate recrystallized twice from methanol gave colorless crystals which sintered at 180° C. and melted with decomposition at 200° C. The crystals had the following elementary analysis:

|  | Found | Calculated for $C_9H_6Cl_6O$ |
|---|---|---|
| Percent C | 31.78 | 31.5 |
| Percent H | 2.30 | 1.77 |

Infra-red analysis showed the presence of ether linkages and the absence of hydroxyl groups. To confirm the identity of the product, 1,7,8,9,10,10-hexachloro-4-oxatricyclo[5.2.1.0$^{2,6}$]-8-decene was prepared by a Diels-Alder diene synthesis from hexachlorocyclopentadiene and 2,5-dihydrofuran; there was no lowering of the melting point when this product was mixed with that obtained from hexachlorocyclopentadiene and cis-2-butene-1,4-diol.

In laboratory tests, the toxicity of 1,7,8,9,10,10-hexachloro-4-oxatricyclo[5.2.1.0$^{2,6}$]-8-decene was demonstrated towards *Epilachna verivestis* larvae, and towards adults of the species *Tetranychus bimachulatus*, as well as against nematodes of the *Panagrellus redivivis* species.

Example 2

By a procedure like that of Example 1, 1,4-dinonyl-cis-2-butene-1,4-diol, available from the reaction of 2 moles of an oxo reaction capraldehyde with 1 mole of acetylene, followed by reduction of the acetylenic bond to an ethylenic bond, is reacted with hexachlorocyclopentadiene to give 1,7,8,9,10,10 - hexachloro - 3,5 - dinonyl - 4 - oxatricyclo[5.2.1.0$^{2,6}$]-8-decene, molecular weight 595.34. ($C_{27}H_{42}Cl_6O$.)

Similarly, 2,5-dimethyl-3-hexene-2,5-diol may be reacted with hexachlorocyclopentadiene to give 1,7,8,9,10, 10 - hexachloro - 3,3,5,5 - tetramethyl - 4 - oxatricyclo[5.2.1.0$^{2,6}$]-8-decene; 2-hexene-1,4-diol and hexachlorocyclopentadiene on adduct formation and cyclization yield 1,7,8,9,10,10 - hexachloro - 3 - ethyl - 4 - oxatricyclo[5.2.1.0$^{2,6}$]-8-decene, etc.

While the invention has been described above with reference to particular procedures and products, other modifications and variations will be obvious to those skilled in the art.

What is claimed is:
1. An oxatricyclodecene of the formula

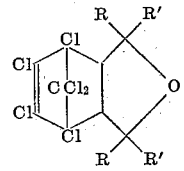

where R is an alkyl radical of from 8 to 18 carbon atoms and R' is hydrogen.
2. 1,7,8,9,10,10 - hexachloro - 3,5 - dinonyl - 4 - oxatricyclo[5.2.1.0$^{2,6}$]-8-decene.

3. A compound of the formula

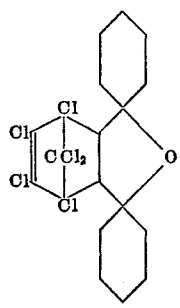

4. 1,1',1'',2,2'',4,4'',5,5'',6,6,6'',6'',7',8',9',10',10' - octadecachloro - 4' - oxadispiro[1,4 - cyclohexadiene - 3,3'-tricyclo[5.2.1.0²',⁶'] - 8' - decene - 5',3'' - 1'',4'' - cyclohexadiene].

5. An oxatricyclodecene of the formula

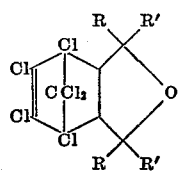

wherein R and R' taken separately are selected from the class consisting of hydrogen atoms and alkyl radicals of from 1 to 18 carbon atoms but at least one R is an alkyl radical having from 8 to 18 carbon atoms, and R and R' taken together form, together with the carbon atom to which they are linked, a six-membered saturated carbocyclic ring system free of substituents other than hydrogen and chlorine atoms.

6. A compound of the formula

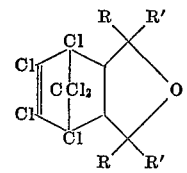

wherein R and R' are taken together and form, together with the carbon atom to which they are linked, a six-membered saturated carbocyclic ring system free of substituents other than hydrogen and chlorine atoms.

No references cited.